(12) United States Patent
Heer

(10) Patent No.: US 6,200,089 B1
(45) Date of Patent: Mar. 13, 2001

(54) COOLANT PUMP

(75) Inventor: Siegfried Heer, Kirchdorf/Krems (AT)

(73) Assignee: TCG Unitech Aktiengesellschaft, Krems (AU)

( * ) Notice: Subject to any disclaimer, the term of this patent is extended or adjusted under 35 U.S.C. 154(b) by 0 days.

(21) Appl. No.: 09/275,436

(22) Filed: Mar. 24, 1999

(30) Foreign Application Priority Data

Mar. 26, 1998 (AT) .................................................. A 538/98

(51) Int. Cl.$^7$ .................................................. F01D 11/00
(52) U.S. Cl. ........................ 415/168.2; 415/230; 417/362
(58) Field of Search ............... 415/168.1, 168.2, 415/111, 112, 113, 229, 231, 170.1; 417/362

(56) References Cited

U.S. PATENT DOCUMENTS

| | | |
|---|---|---|
| 2,028,360 | 1/1936 | Sprink . |
| 4,911,610 | 3/1990 | Olschewski et al. . |
| 4,955,786 * | 9/1990 | Kunkel et al. .................. 415/110 |
| 5,026,253 * | 6/1991 | Borger .................. 415/229 |
| 5,071,316 * | 12/1991 | Diem et al. .................. 415/168.1 |
| 5,125,795 * | 6/1992 | Suzuki et al. .................. 415/168.2 |
| 5,217,350 * | 6/1993 | Kimura et al. .................. 415/175 |
| 5,224,823 * | 7/1993 | Cordis . |
| 5,950,577 * | 9/1999 | Sasaki et al. .................. 123/41.44 |

FOREIGN PATENT DOCUMENTS

| | | |
|---|---|---|
| 2255017 | 5/1973 | (DE) . |
| 2626875 | 1/1977 | (DE) . |
| 41 00 507 * | 5/1992 | (DE) . |
| 922740 | 2/1947 | (FR) . |
| 989105 | 5/1951 | (FR) . |
| 1 400 629 * | 7/1975 | (GB) . |

* cited by examiner

*Primary Examiner*—Edward K. Look
*Assistant Examiner*—Ninh Nguyen
(74) *Attorney, Agent, or Firm*—Dykema Gossett PLLC

(57) ABSTRACT

A coolant pump, in particular for use in internal combustion engines, includes a pump shaft carrying an impeller with substantially axial intake and radial discharge, and a casing provided with at least one roller bearing supporting the pump shaft, and a pulley for driving the pump. A particularly compact design is obtained by firmly connecting the inner race of the roller bearing to the casing, and by attaching the outer race of the roller bearing to the pulley.

10 Claims, 2 Drawing Sheets

COOLANT PUMP

BACKGROUND OF THE INVENTION

This invention relates to a coolant pump, particularly for use with internal combustion engines.

DESCRIPTION OF THE PRIOR ART

Conventional-type coolant pumps for motor vehicles usually are driven via a pulley and a belt, which is moved by a second pulley on the engine crankshaft. In such coolant pumps the pulley is wedged onto one end of a pump shaft whose middle part is supported in the pump casing. On the opposite end of the shaft there is located an impeller with axial intake and radial discharge. In order to prevent any leakage of the conveyed coolant, a seal is provided between the impeller and the bearings, which is usually configured as a shaft seal. On account of the individual components to be positioned on the pump shaft a certain amount of space must be provided for this type of water pump in axial direction. As there is a growing tendency in modern motor vehicles to economize in available space, a more compact design of the coolant pump is desired. In conventional types of coolant pumps component dimensions cannot be reduced beyond certain limits, however, due to maximum permissible loads.

For the above reasons a coolant pump is needed which will require considerably less space whilst other features may remain unchanged. In particular, dimensions in axial direction should be diminished.

A water pump is described in FR-A 989 105, where the inner race of the roller bearing is firmly connected to the casing, and the outer bearing race is essentially attached to the pulley. The advantage of this design is that the interior space of the pulley driving the pump can be used for housing other components. In this way a most compact type of coolant pump is obtained. Similar solutions are disclosed in DE-A 26 26 875, U.S. Pat. No. 4,911,610, or U.S. Pat. No. 2,028,360.

It has been found, however, that it is not always possible to prevent leaking, even if seals are made most carefully. To prevent bearings and other components of the coolant pump from damage due to coolant leakage, provisions must be made for disposal of a small quantity of leaking fluid. It is desirable in this context to avoid all visible fluid traces. For this purpose so-called leakage chambers have been provided, which can receive a certain amount of coolant and are open towards the environment, permitting the leaking fluid to evaporate eventually. Conventional leakage chambers require additional space, however, and are thus considered undesirable for the above reasons.

SUMMARY OF THE INVENTION

It is an object of this invention to avoid the above disadvantages and to provide a coolant pump which will combine reliability of operation and a most compact design.

The configuration proposed by the invention will offer a large leakage chamber without the need for increased longitudinal dimensions of the coolant pump, thus ensuring safe operation without damage to the roller bearings. Even in the instance of increased leakage due to wear after prolonged periods of operation, any visible seepage of the cooling medium can be reliably prevented.

A special advantage of the invention is the comparatively large diameter of the roller bearing supporting the pump shaft and the pulley, which will ensure a long working life. It is a further feature of the invention that the shaft is not directly supported by the bearing but via the pulley. As the force of the drive belt constitutes the largest load, favorable conditions of force transmission are established.

The design may be further improved by attaching the inner race of the roller bearing to an essentially cylindrical projection of the casing, which projects from the casing in a direction opposite to the intake flow of the impeller. In this way a rigid structure is obtained.

A particularly space-saving configuration of the invention is achieved by providing the pulley with a mounting hub to which the pump shaft is firmly attached, and by placing the hub essentially on the inside of the roller bearing.

It is principally possible to provide a single roller bearing for supporting the drive shaft, which can accommodate a certain amount of axial load in addition to the radial forces applied. By providing two roller bearings side by side a reduction of the load on each individual roller bearing may be obtained.

Design flexibility in configuring the roller bearing of the invention may be further increased by providing a shaft seal between the mounting hub of the pulley and the impeller, whose outer diameter preferably is smaller than the inner diameter of the roller bearing.

Optimum use of the available space is made by positioning the pulley directly adjacent to the pressure chamber of the pump. In this manner the space available in axial direction is utilized to the full.

Special preference is given to a design variant of the invention in which the pulley includes a shoulder to which is attached the outer race of the roller bearing, and a disk on the inside of the shoulder, which is located on the opposite side of the impeller and carries a hub which extends towards the impeller of the pump. This configuration has the advantage that the pressure which is applied by the belt on the pulley in radial direction, will affect the roller bearing only radially. In a conventional coolant pump, the pressure of the belt on the pulley causes a tilting moment, which adds to the load on the roller bearings.

BRIEF DESCRIPTION OF THE DRAWINGS

The invention will now be further described with reference to the accompanying drawings, in which.

DETAILED DESCRIPTION OF THE PREFERRED EMBODIMENT

Figure 1:
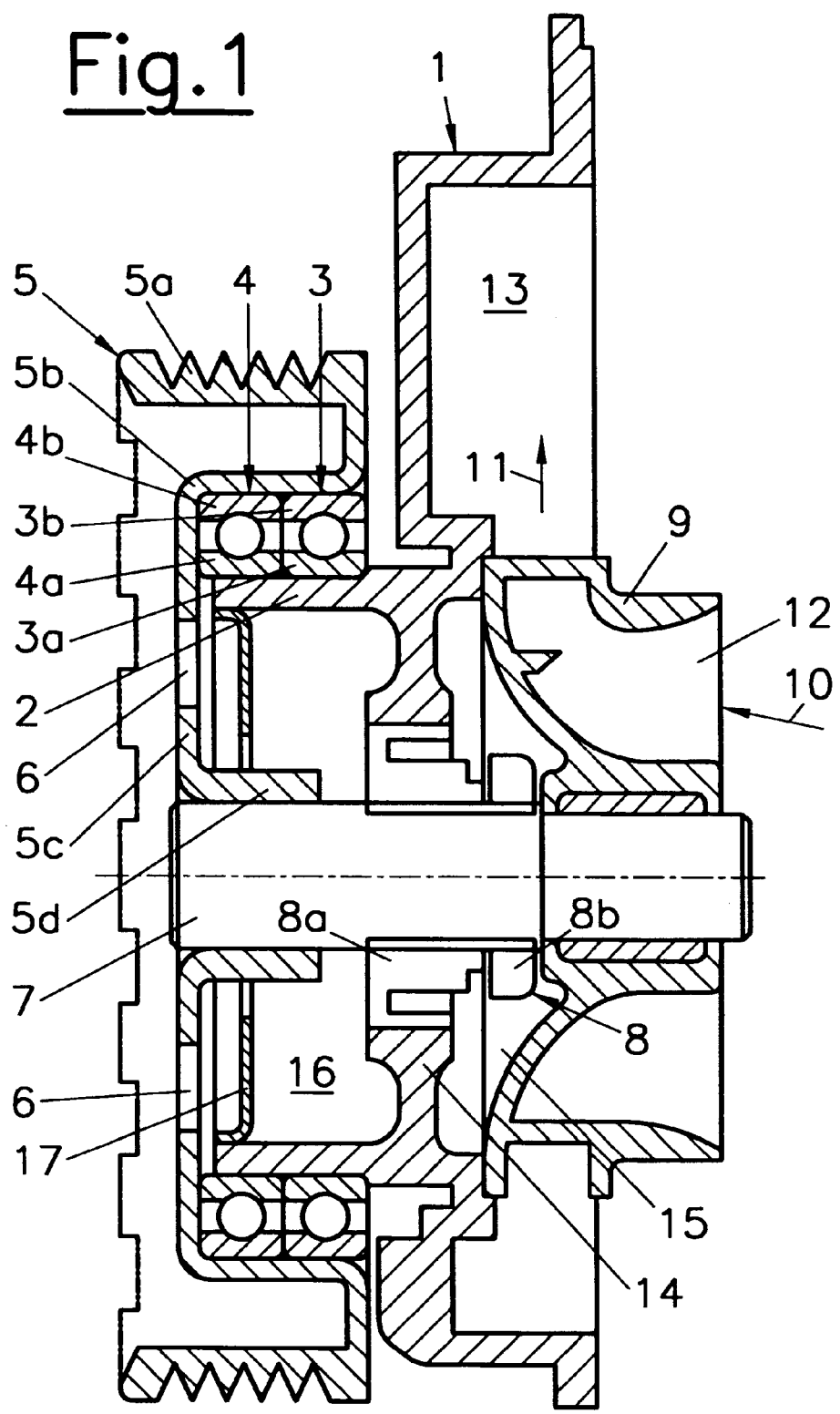
FIG. 1 is a section through a coolant pump according to the invention.
Figure 2:
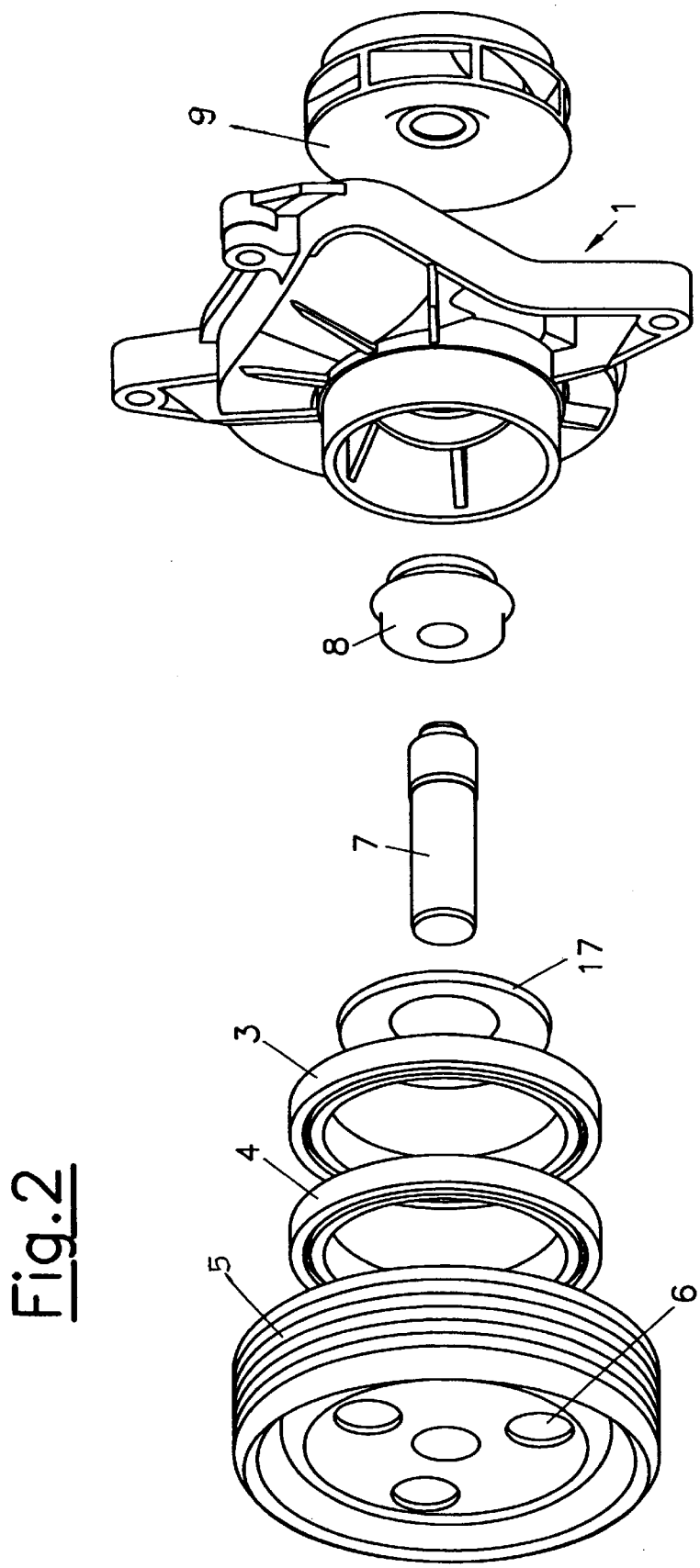
FIG. 2 is an exploded view of the pump in FIG. 1.

The coolant pump described by the invention has a casing 1 which is closed by a cover (not shown here) in a conventional manner. The casing 1 has a cylindrical projection 2 to which are attached the inner races 3a, 4a of two roller bearings 3, 4. The outer races 3b, 4b of the roller bearings 3, 4 support a pulley 5 for driving the coolant pump. On the outer periphery of the pulley 5 a bearing surface 5a is provided for a drive belt (not shown here) in a conventional manner. Below this bearing surface 5a there is positioned a shoulder 5b, to which are attached the outer races 3b, 4b of the roller bearings 3, 4. The roller bearings 3, 4 are secured in axial direction by retaining rings (not shown here). A disk 5c extends inwardly from the shoulder 5b in radial direction, which features a plurality of openings 6. Adjacent to the disk 5c is a hub 5d, against which the pump shaft 7 is wedged. The pulley 5 is a single-piece casting.

Adjacent to the hub 5d a shaft seal 8 is provided on the pump shaft 7, which is configured as a conventional axial shaft seal. The shaft seal 8 comprises a stationary element 8a and an element 8b rotating with the pump shaft 7. Adjacent to the shaft seal 8 a pump impeller 9 is attached to the pump shaft 7, which takes in the cooling medium in the direction of arrow 10 and delivers it in the direction of arrow 11. The pump cover not shown in this drawing is used to close the intake chamber 12 and pressure chamber 13 of the pump in a known manner.

The stationary element 8a of the shaft seal 8 is supported on an inwardly projecting flange 14 of the casing 1. The shaft seal 8 will prevent the coolant from seeping from the sealing chamber 15 into the leakage chamber 16 located behind it. It will not always be possible, however, to completely prevent small amounts of coolant from penetrating into the leakage chamber 16, especially when the coolant pump is not in operation. By means of an essentially ring-shaped piece of sheet-metal, i.e., a separating ring 17, which is attached to the end of the cylindrical projection 2, a kind of sump is formed in the lower part of the leakage chamber 16, which will receive a certain amount of coolant and thus prevent it from reaching the roller bearings 3, 4. During operation of the coolant pump the coolant retained in the leakage chamber 16 can evaporate and the vapor can escape through the openings 6 in the disk 5c of the pulley 5.

The roller bearings 3, 4 are configured as radial bearings in this embodiment of the invention, which are mainly subjected to loads in radial direction by the force applied by the drive belt (not shown here) on the pulley 5. As a consequence thereof, and because of the fact that the roller bearings 3, 4 have a particularly large diameter, a long working life and comparatively small dimensions will be possible.

In addition to its other advantages the coolant pump of the invention is easy to assemble. The roller bearings 3 and 4 are slid onto the cylindrical projection 2 of the casing 1 and are axially secured. Then the pulley 5, together with the pump shaft 7 connected thereto, is attached to the outer races 3b, 4b of the roller bearings 3, 4, and secured by means of a Truarc retaining ring or the like. In a next step, the shaft seal 8 and the pump impeller 9 can be mounted on the pump shaft 7. In a final step, the pump cover (not shown here) is attached.

The configuration of the coolant pump proposed by the invention will result in a most compact design with overall dimensions of 50 mm and less in axial direction.

What is claimed is:

1. Coolant pump which includes a pump shaft carrying an impeller having a substantially axial intake and a radial discharge; a casing in which said shaft extends, said casing including an annular projection which extends around said shaft and away from said impeller; a pulley for driving said shaft, said pulley including an outer portion located radially outwardly of said annular projection, a disc portion which extends radially inwardly toward said shaft, and a hub portion which is attached to said shaft so as to exclusively support said shaft in said casing; and a roller bearing mounted between said annular projection and said outer portion of said pulley, said annular projection and said shaft defining a leakage chamber therebetween.

2. Coolant pump as claimed in claim 1, wherein the roller bearing includes an inner bearing attached to the annular projection of the casing and an outer bearing attached to the outer portion of the pulley.

3. Coolant pump as claimed in claim 1, wherein two roller bearings are provided side by side.

4. Coolant pump as claimed in claim 1, wherein the roller bearing is located in a space inside a bearing surface of the pulley.

5. Coolant pump as claimed in claim 1, wherein a shaft seal is provided between the mounting hub of the pulley and the impeller, whose outer diameter preferably is smaller than the inner diameter of the roller bearing.

6. Coolant pump as claimed in claim 1, wherein the pulley is located directly adjacent to the pressure chamber of the pump.

7. Coolant pump as claimed in claim 1, wherein the pulley includes a shoulder to which is attached the outer race of the roller bearing, and a disk on the inside of the shoulder, which is located on the opposite side of the impeller and carries a hub which extends towards the impeller of the pump.

8. Coolant pump as claimed in claim 7, wherein the disk has openings.

9. Coolant pump as claimed in claim 1, wherein a sheet-metal separating ring is provided inside the leakage chamber, which is attached to a cylindrical projection of the casing.

10. Coolant pump as claimed in claim 9, wherein the stationary element of the shaft seal is supported on an inwardly projecting flange of the casing, and wherein said flange and the separating ring together form a sump, which will receive an amount of leaking water penetrating through the shaft seal.

* * * * *

UNITED STATES PATENT AND TRADEMARK OFFICE
CERTIFICATE OF CORRECTION

PATENT NO. : 6,200,089 B1
DATED : March 13, 2001
INVENTOR(S) : Siegfried Heer

It is certified that error appears in the above-identified patent and that said Letters Patent is hereby corrected as shown below:

<u>Title page:</u>
[73] Assignee: TCG Unitech Aktiengesellschaft
    Kirchdorf/Krems (AT)

Signed and Sealed this

Twenty-third Day of October, 2001

Attest:

NICHOLAS P. GODICI
*Attesting Officer*   *Acting Director of the United States Patent and Trademark Office*